US006981736B2

(12) United States Patent
Morsch et al.

(10) Patent No.: US 6,981,736 B2
(45) Date of Patent: Jan. 3, 2006

(54) FLOOR-SUPPORTING CONFIGURATION IN MOTOR VEHICLES

(75) Inventors: Klaus-Dieter Morsch, Braunschweig (DE); Jürgen Hillmann, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/039,482

(22) Filed: Jan. 19, 2005

(65) Prior Publication Data

US 2005/0140179 A1 Jun. 30, 2005

Related U.S. Application Data

(63) Continuation of application No. PCT/EP03/07034, filed on Jul. 2, 2003.

(30) Foreign Application Priority Data

Jul. 19, 2002 (DE) ................................ 102 32 841

(51) Int. Cl.
*B60R 27/00* (2006.01)
(52) U.S. Cl. .............................. 296/193.07; 296/203.1; 296/204; 296/187.03
(58) Field of Classification Search ........... 296/193.07, 296/203.1, 203.02, 187.01, 204, 187.03, 296/193.09, 203.03, 187.09; 248/429; 280/781
See application file for complete search history.

(56) References Cited

U.S. PATENT DOCUMENTS

| | | | |
|---|---|---|---|
| 4,186,957 A | 2/1980 | Lutze et al. | |
| 4,188,059 A | 2/1980 | Bauer et al. | |
| 4,189,177 A | 2/1980 | Schwuchow et al. | |
| 4,557,519 A | 12/1985 | Matsuura | |
| 5,002,333 A * | 3/1991 | Kenmochi et al. | 296/204 |
| 5,011,201 A * | 4/1991 | Takahashi et al. | 296/203.02 |
| 5,048,888 A * | 9/1991 | Willy et al. | 296/187.03 |
| 5,090,774 A | 2/1992 | Dolla | |
| 5,346,276 A * | 9/1994 | Enning et al. | 296/187.09 |
| 5,352,011 A * | 10/1994 | Kihara et al. | 296/203.03 |
| 5,562,329 A * | 10/1996 | Srock et al. | 296/203.01 |
| 5,806,918 A * | 9/1998 | Kanazawa | 296/204 |
| 6,027,159 A * | 2/2000 | Baumann | 296/187.03 |
| 6,145,923 A | 11/2000 | Masuda | |
| 6,227,610 B1 * | 5/2001 | Iwatsuki et al. | 296/204 |
| 6,270,153 B1 * | 8/2001 | Toyao et al. | 296/204 |
| 6,499,798 B2 | 12/2002 | Takemoto | |
| 6,540,286 B2 * | 4/2003 | Takemoto et al. | 296/204 |
| 6,619,730 B2 * | 9/2003 | Porner | 296/204 |
| 6,666,501 B1 * | 12/2003 | Logan et al. | 296/193.07 |
| 6,705,667 B1 * | 3/2004 | Bartesch et al. | 296/187.01 |
| 6,799,276 B1 * | 9/2004 | Belissent | 713/201 |
| 6,817,657 B2 * | 11/2004 | Watanabe et al. | 296/203.02 |

(Continued)

FOREIGN PATENT DOCUMENTS

DE 1 245 763 7/1967

(Continued)

*Primary Examiner*—Kiran B. Patel
(74) *Attorney, Agent, or Firm*—Laurence A. Greenberg; Werner H. Stemer; Manfred Beck

(57) ABSTRACT

A floor-supporting configuration in motor vehicles that is optimized to prevent deformation of the foot well of the passenger cell and has a high degree of inherent stiffness in the event of a crash, particularly a head-on collision, while substantially limiting force absorption and force transfer to areas below and behind the passenger cell is provided. The desired stiffness and force transfer is essentially achieved by a special configuration of the longitudinal members, the front floor crossmember, and the sills relative to one another and by a special connection of these elements to one another.

19 Claims, 7 Drawing Sheets

U.S. PATENT DOCUMENTS

| | | | |
|---|---|---|---|
| 6,830,289 B2 * | 12/2004 | Miyabayashi | 296/193.07 |
| 2001/0028179 A1 | 10/2001 | Takemoto et al. | |
| 2002/0074830 A1 | 6/2002 | Takemoto | |
| 2004/0200659 A1 * | 10/2004 | Miyasaka | 296/193.09 |

FOREIGN PATENT DOCUMENTS

| | | |
|---|---|---|
| DE | 2 152 165 | 4/1973 |
| DE | 27 25 083 C2 | 12/1978 |
| DE | 44 38 717 A1 | 5/1986 |
| DE | 40 29 153 C2 | 4/1991 |
| DE | 39 42 794 C2 | 7/1991 |
| DE | 42 05 891 C2 | 9/1993 |
| DE | 43 10 883 C2 | 10/1994 |
| DE | 196 32 712 C2 | 2/1998 |
| DE | 101 51 211 A1 | 6/2002 |
| EP | 0 602 331 A1 | 6/1994 |
| EP | 0 693 414 B1 | 12/1996 |
| EP | 1 029 773 A2 | 8/2000 |
| EP | 1 186 516 A1 | 3/2002 |
| JP | 10-264846 | 10/1998 |

* cited by examiner

FLOOR-SUPPORTING CONFIGURATION IN MOTOR VEHICLES

CROSS-REFERENCE TO RELATED APPLICATION

This is a continuing application, under 35 U.S.C. § 120, of copending international application No. PCT/EP03/07034 filed Jul. 2, 2003, which designated the United States; this application also claims the priority, under 35 U.S.C. § 119, of German patent application No. 102 32 841.2, filed Jul. 19, 2002; the prior applications are herewith incorporated by reference in their entirety.

BACKGROUND OF THE INVENTION

Field of the Invention

The invention relates to a floor-supporting configuration in motor vehicles including a front floor crossmember, which extends transversely to the longitudinal axis of the vehicle between two sills extending alongside the vehicle bodywork and which is fixedly connected to the sills. The vehicle bodywork includes two longitudinal members which are disposed between the sills and extend from the front part of the vehicle rearward under a floor panel.

Various embodiments of floor-supporting configurations in motor vehicles are known. For example, Published European Patent Application No. EP 0 602 331 A1 discloses bodywork longitudinal members which are offset in height and extend downward below the floor panel. In order to avoid deformations of the footwell of the passenger cell in the event of a crash, in particular a head-on crash, the longitudinal members have an energy-absorbing member section followed by an easily deformable member section in their upper region.

Furthermore, German Patent No. DE 42 05 891 C2 discloses bifurcating the longitudinal members in the region of the passenger cell. The inner longitudinal member element is spatially close to a central tunnel and the outer longitudinal member element spatially close to a door sill. This measure is intended to increase the strength of the floor assembly and to permit an improved introduction and transmission of force in the event of applications of large forces.

German Patent No. DE 40 29 153 C2, corresponding to U.S. Pat. No. 5,090,774, furthermore discloses a floor assembly with a front crossmember which, for its part, is placed from outside against a floor panel forming a foot slope and is connected to laterally extending sills. Two longitudinal members which are offset in height extend from the front part of the vehicle rearward under the floor panel, but are not connected to the crossmember, which is provided in the region of the floor slope, but rather, are supported on the floor panel and on rear crossmembers which, for their part, are likewise connected to the sills. In the event of a crash, the forces acting on the longitudinal members are to be introduced into the sills, the floor panel and, if appropriate, the central tunnel and are to be absorbed by these components.

Furthermore, Published European Patent Application No. EP 0 693 414 A1, corresponding to U.S. Pat. No. 5,562,329, discloses a body structure of a passenger vehicle which includes an end wall arranged between the front part of the vehicle and the passenger cell. Two front longitudinal members, which are spaced apart from each other, are connected in each case to a floor member, which is situated behind them and proceeds as an extension of the longitudinal members. The body structure further includes lateral outer sills, upright hinge pillars (A-pillars) and a floor. In this case, the two front longitudinal members extend continuously as far as the end wall and are connected to a first crossmember, which is placed onto the outside of the end wall. Level with this crossmember, a second crossmember is arranged on the side facing the passenger cell and is, for its part, connected to the central tunnel and divides on the end side into two hollow members which are arranged one above the other, the upper hollow member section being connected to the end wall and the hinge pillar, and the lower hollow member section being connected to the end wall, the sill and the floor. The intention, as a result, is firstly to provide a stiff passenger cell and secondly to absorb head-on impact forces readily and introduce them over a large surface area via the front longitudinal members into the adjacent body structure.

It has proven disadvantageous that, as a consequence of introducing force into the upper passenger cell regions, namely the hinge pillars and accordingly also into the roof structure, these have to be appropriately configured and dimensioned and stiffened in order to avoid a deformation of the passenger cell in this region.

SUMMARY OF THE INVENTION

It is accordingly an object of the invention to provide a vehicle body configuration and more specifically a floor-supporting configuration for motor vehicles which overcome the above-mentioned disadvantages of the heretofore-known configurations of this general type and which, with high inherent stiffness, ensure an optimum freedom from deformation of the footwell of the passenger cell in the event of a crash, in particular a head-on crash, and limit the absorption and further transmission of force essentially to regions below and behind the passenger cell.

With the foregoing and other objects in view there is provided, in accordance with the invention, a vehicle body configuration, including:

a passenger cell including a floor panel closing off the passenger cell at a bottom thereof;

a vehicle front part adjacent the passenger cell;

two sills extending alongside the passenger cell;

two longitudinal members disposed between the two sills and extending from the vehicle front part rearward under the floor panel;

a floor-supporting configuration including a front floor crossmember with an end panel, the front floor crossmember being fixedly connected to the two sills and extending, between the two sills, transversely with respect to a longitudinal vehicle axis;

each of the longitudinal members butting, with a first profile cross section, against the end panel of the front floor crossmember;

each of the longitudinal members extending, offset in height, with a second profile cross section smaller than the first profile cross section, under the floor panel; and the floor supporting configuration includes web plates, the sills have cutouts formed therein, the front floor crossmember is fixed, via the web plates, on the sills having the cutouts.

In other words, according to the invention, there is provided a floor-supporting configuration in motor vehicles, including a front floor crossmember, which extends transversely to the longitudinal axis of the vehicle between two sills disposed at the sides of the vehicle bodywork and is connected fixedly to them, and two longitudinal members, which are disposed between the sills and, for their part, extend from the front part of the vehicle rearward under a floor panel, which closes off the passenger cell downward, wherein the longitudinal members butt with a large profile cross section against the end panel of the front floor crossmember and are subsequently guided offset in height with a profile cross section which is smaller in comparison under the floor panel, the front floor crossmember being fixed on cut-out or stamped-out sills by web plates.

This measure ensures, firstly, that a footwell is protected against deformation and, secondly, that forces, which occur, are introduced in a defined and consistent manner, via the longitudinal members and the front crossmember, predominantly into components below the passenger cell. A loading of the pillars and/or of the roof structure as a consequence of a crash are avoided to the greatest possible extent as a result. The special connection of the front floor crossmember to cut-out or stamped-out sills by the web plates produces particularly stiff connections, like a junction element, which, in contrast to Published European Patent Application No. EP 0 693 414 A1, make it unnecessary to directly connect the floor crossmember to upper regions of adjacent pillars.

According to another feature of the invention, the longitudinal members are embodied as continuous longitudinal members.

According to yet another feature of the invention, the longitudinal members each include an upper member portion with the first profile cross section and a lower member portion with the second profile cross section, such that the upper member portion is placed on the end panel and such that the lower member portion is embodied as a separate profile offset downward with respect to the upper member portion and extends under the floor panel.

According to a further feature of the invention, the longitudinal members extend, under the floor panel, to a seat crossmember disposed at a middle region of the passenger cell.

According to yet a further feature of the invention, the longitudinal members extend to a rear floor crossmember disposed at a rear region of the passenger cell, such that the longitudinal members extend obliquely outward toward the sills and such that the longitudinal members brace against a stiff bodywork component.

According to another feature of the invention, the longitudinal members brace against a stiff bodywork component configured as a junction element.

According to yet another feature of the invention, the front floor crossmember and/or the longitudinal members are shaped steel sheet element formed from a tailored blank.

According to another feature of the invention, the front floor crossmember and/or the longitudinal members is a high-tensile steel element.

According to an added feature of the invention, there is provided a tunnel element disposed in the passenger cell such that the tunnel element extends in a direction of the longitudinal vehicle axis; and the front floor crossmember is fixed, with a central region thereof, to the tunnel element.

According to another feature of the invention, the front floor crossmember is an open hollow-profile member placed, from within the passenger cell, against an upwardly extending portion of the floor panel.

According to yet another feature of the invention, the front floor crossmember includes at least two profile shells placed on one another, such that the at least two profile shells form a closed hollow profile adjoining the floor panel.

According to a further feature of the invention, a further longitudinal member element is disposed between each respective one of the longitudinal members and the tunnel element and is placed from below against the floor panel.

According to an additional feature of the invention, an add-on longitudinal member is assigned to the further longitudinal member element such that the add-on longitudinal member is disposed, in the passenger cell, opposite the further longitudinal member element.

According to another feature of the invention, a reinforcing plate is disposed on the floor panel in a region of the passenger cell where the tunnel element, the front floor crossmember and the floor panel meet one another.

According to a further feature of the invention, the reinforcing plate covers at least a portion of the tunnel element.

According to yet a further feature of the invention, there is provided an A-pillar connecting element disposed next to each respective one of the longitudinal members and substantially on a same level as the longitudinal members, the A-pillar connecting element being fixedly connected to the respective one of the longitudinal members.

According to another feature of the invention, auxiliary frame mounts are disposed at the longitudinal members and/or at the further longitudinal member element.

With the objects of the invention in view there is also provided, in a vehicle body having a passenger cell with a floor panel closing off the passenger cell at a bottom thereof, a vehicle front part adjacent the passenger cell, two sills extending alongside the vehicle body, two longitudinal members disposed between the two sills and extending from the vehicle front part rearward under the floor panel, a floor-supporting configuration, including:
a front floor crossmember with an end panel, the front floor crossmember being fixedly connected to the two sills and extending, between the two sills, transversely with respect to a longitudinal vehicle axis;
each of the longitudinal members butting, with a first profile cross section, against the end panel of the front floor crossmember;
each of the longitudinal members extending, offset in height and with a second profile cross section smaller than the first profile cross section, under the floor panel; and
web plates for connecting the front floor cross member to the sills, such that the front floor crossmember is fixed, via the web plates, on the sills which have cutouts formed therein.

According to an advantageous embodiment, the longitudinal members are embodied continuous from the front to the rear.

Another advantageous embodiment makes provision for the longitudinal members to be configured in such a manner that the respective upper member section having the large profile cross section is placed on the end panel of the front floor crossmember and the lower member section having the smaller profile cross section, forming a separate profile, is offset downward and continued below the floor panel.

According to another embodiment according to the invention, the longitudinal members are either in each case guided until level with a seat crossmember, which is disposed approximately in the center of the passenger cell, or in each case extend obliquely outward, until level with the rear region of the passenger cell, into the direct vicinity of the sill and of a rear floor crossmember and are supported on a stiff bodywork component as a junction element.

In this case, the front floor crossmember and/or the longitudinal members can be made of formed steel sheet, which is manufactured according to the tailored-blank technique, or of a higher strength steel sheet.

In accordance with the invention, it is furthermore advantageous for the front floor crossmember to be fixed centrally on a tunnel element disposed in the longitudinal direction of the vehicle within the passenger cell.

According to a further embodiment of the invention, the front floor crossmember is formed by an open-hollow profile which is placed from within the passenger cell against a floor panel which is guided upward. The front floor crossmember may likewise be formed by at least two profile shells which are placed one on the other and which, for their part, form a closed hollow profile and adjoin a floor panel.

As the invention furthermore provides, between each longitudinal member and the tunnel element at least one further longitudinal member element can be placed from below against the floor panel, wherein it is possible for this further longitudinal member element to be optionally assigned, lying opposite it on the passenger cell side, an add-on member. It is furthermore regarded as being expedient according to the invention for a reinforcing plate reaching, if appropriate, into the contour of the tunnel element to be placed on the floor panel on the passenger cell side, at least in the connecting corner region of the tunnel element, front floor crossmember and floor panel. As the invention furthermore provides, each longitudinal member is connected fixedly to an A-pillar connecting element provided next to it in virtually the same plane. Finally, provision is made to have mounts for securing an auxiliary frame assigned to the longitudinal members and/or the longitudinal member elements.

Other features which are considered as characteristic for the invention are set forth in the appended claims.

Although the invention is illustrated and described herein as embodied in a floor-supporting configuration in motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
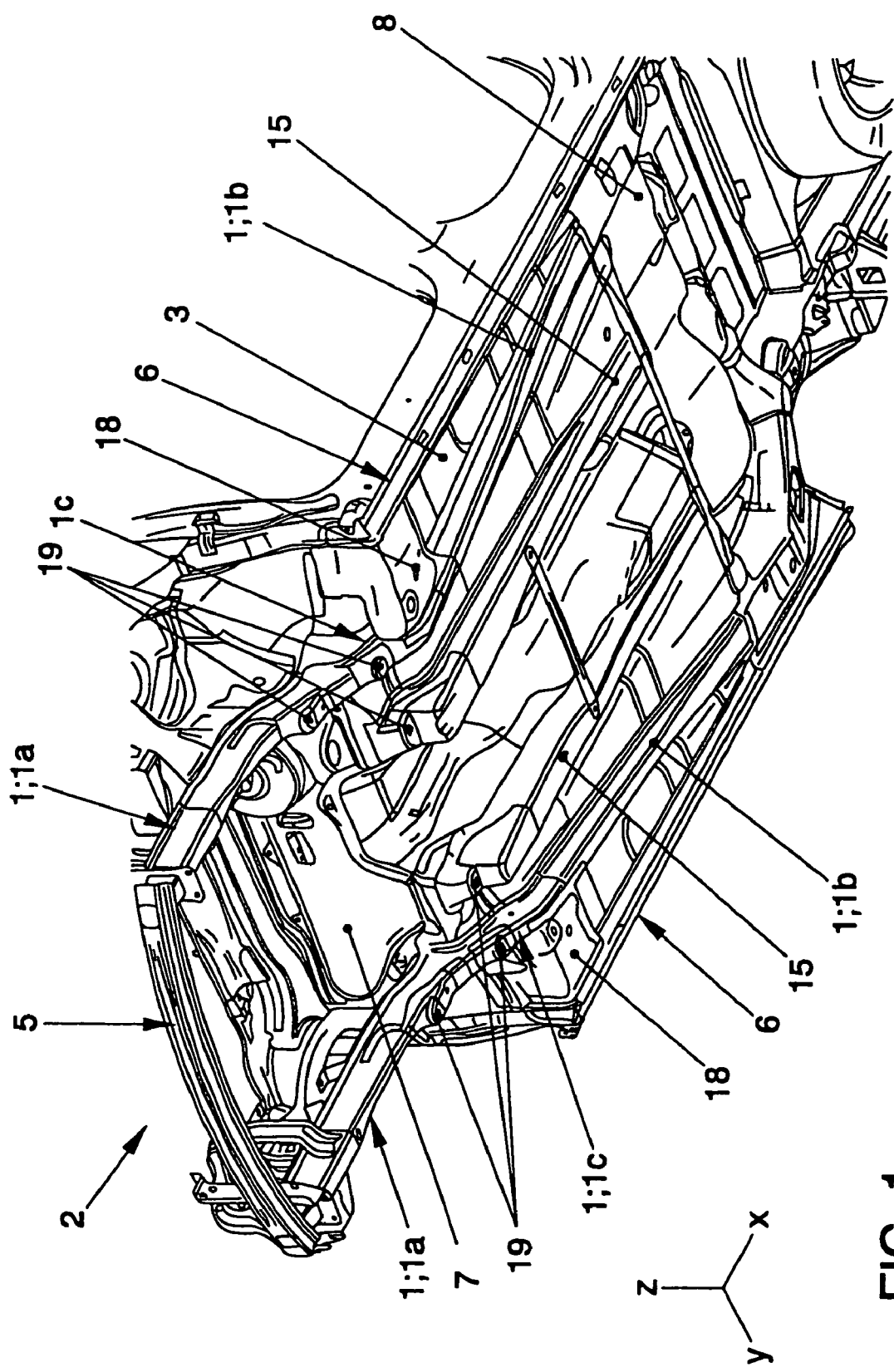
FIG. 1 is a diagrammatic perspective view from below of a floor-supporting configuration of a motor vehicle, in the present case of a passenger vehicle, according to the invention.

Referring now to the figures of the drawings in detail and first, particularly, to FIG. 1 thereof, there is shown the front underbody region of a motor vehicle in a perspective view. The coordinate axes are indicated as x, y, and z such that the x-axis extends along a longitudinal direction.

According to FIG. 1, two longitudinal members 1 which are provided on both sides of the motor vehicle are guided from the front part 2 of the motor vehicle, where they support the engine unit, in a manner such that they are offset in height, downward below the floor panel 3 of the passenger cell 4. On the front side, the two longitudinal members 1 are connected to each other by a bumper 5. The laterally outermost boundary of the motor vehicle bodywork forms so-called sills 6 which extend on both sides in each case in the longitudinal direction of the vehicle and, for their part, are connected to a front floor crossmember 7, which is arranged transversely to the longitudinal axis of the vehicle, and a rear floor crossmember 8.

According to the invention, the longitudinal members 1 butt with a large profile cross section 1a against the end panel 9 of the front floor crossmember 7 and are then guided offset in height with a profile cross section 1b, which is smaller in comparison, below the floor panel 3.

Figure 2:
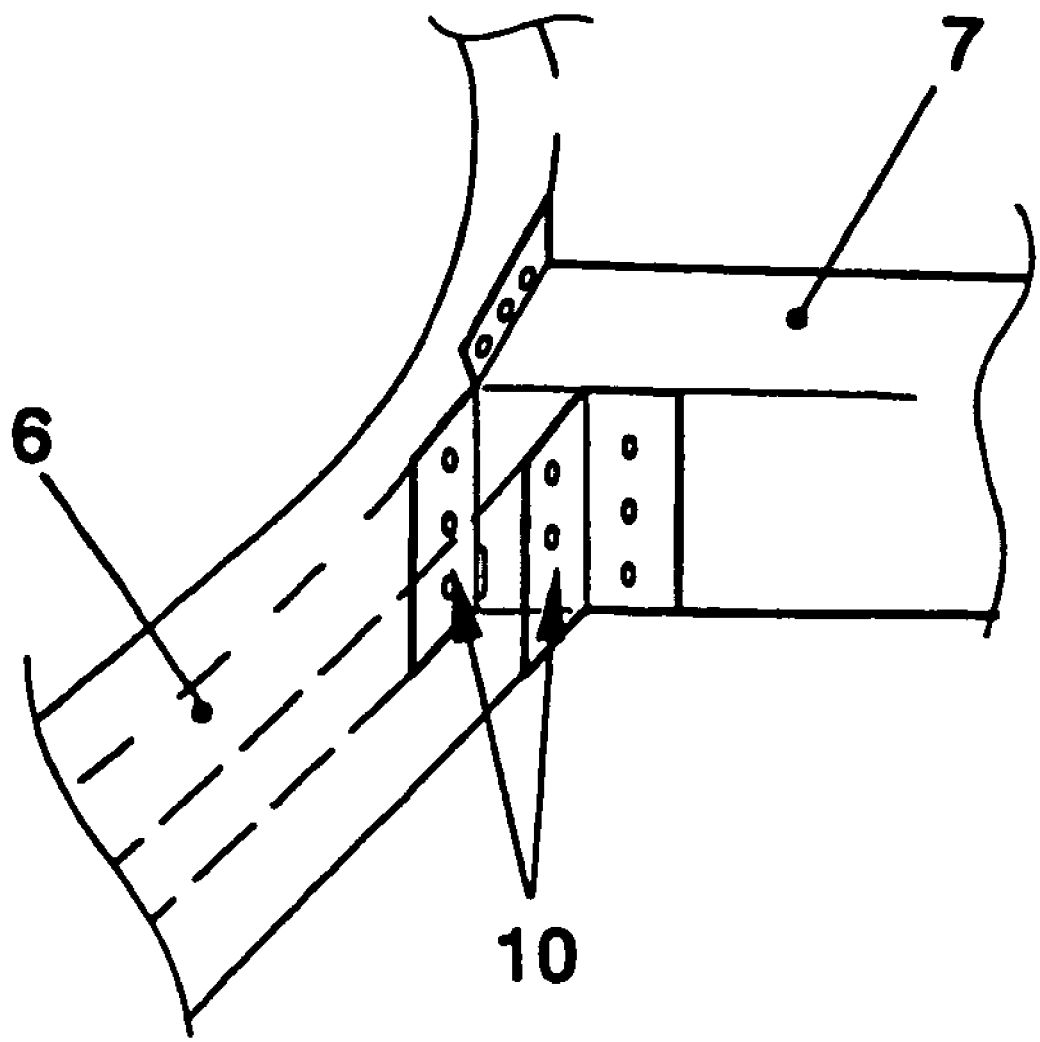
FIG. 2 is a diagrammatic, partial perspective view of the connection of the floor crossmember to the sills according to the invention.

The effect of this measure is, firstly, a good impact stability, in particular due to the direct connection of the large profile cross sections 1a of the longitudinal members 1 to the front floor crossmember 7, and, secondly, as already shown above, this measure ensures that a footwell is protected against deformation. As shown in detail in FIG. 2, the front floor crossmember 7 is furthermore fixed by web plates 10 on sills 6 which have cutouts. As a result, forces, which may occur for example in a crash, are introduced in a defined and consistent manner via the longitudinal members 1 and the front floor crossmember 7 predominantly into components below the passenger cell 4. A loading of the pillars 11, shown as A-pillars in FIG. 9, and/or of the roof structure as a consequence of a head-on crash can be avoided to the greatest possible extent as a result. The special connection of the front floor crossmember 7 to the cutout or stamped-out sills 6 via the web plates 10 provides particularly stiff connections, similar to a junction element.

Figure 3:
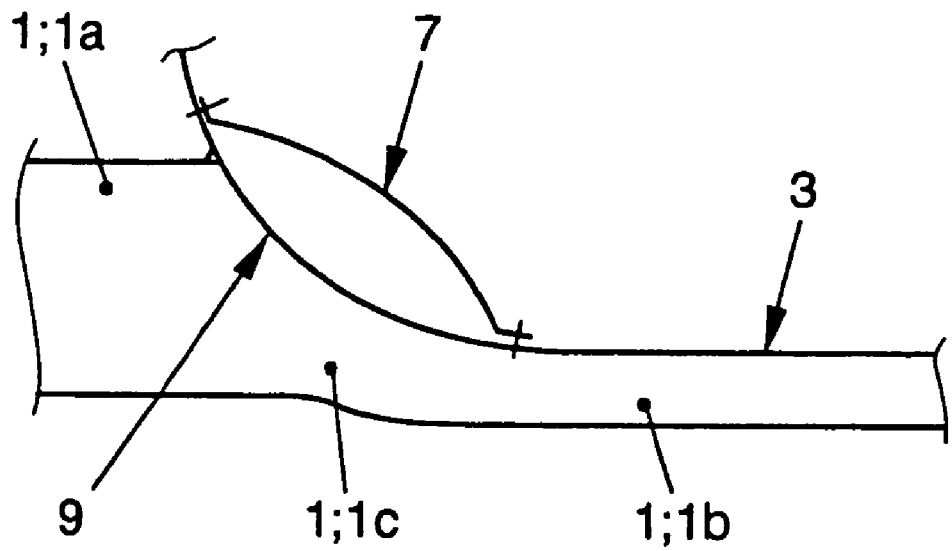
FIG. 3 is a diagrammatic partial sectional view of the configuration of the longitudinal members in a first variant embodiment according to the invention.

According to FIGS. 1 and 3, the longitudinal members 1 are embodied as continuous or one-piece members in such a manner that although the member section having the large profile section 1a butts against the end plate 9 of the front floor crossmember 7, the longitudinal member is continued, via a connecting section 1c, in the member section which is arranged offset in height and has the smaller profile section 1b. This measure ensures that force continues to be transmitted without interruption into the rear bodywork region.

Figure 4:
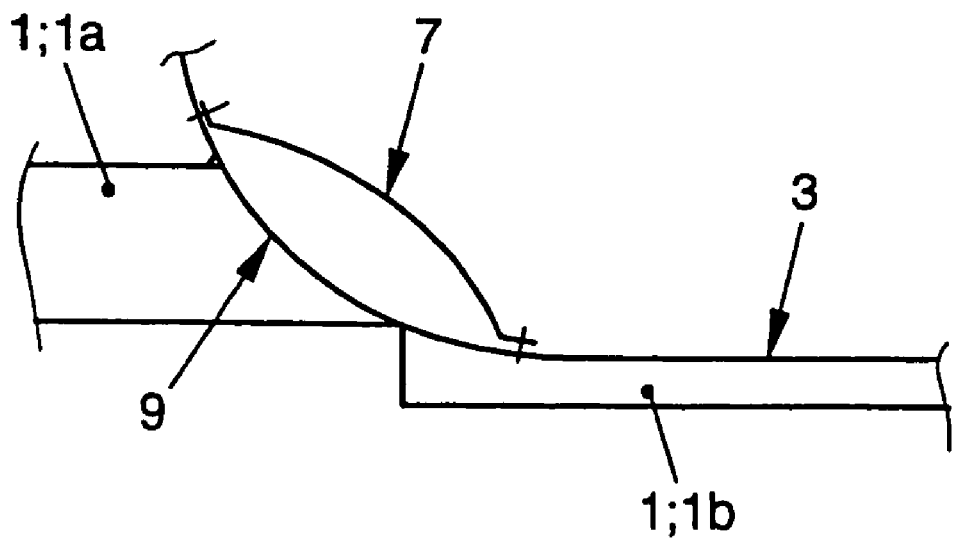
FIG. 4 is a diagrammatic partial sectional view of the configuration of the longitudinal members in a second variant embodiment according to the invention.

A result which is comparable in respect of the manner of operation is obtained according to FIG. 4 by the fact that the upper member section having the large profile cross section 1a is likewise placed onto the end plate 10 of the front floor crossmember 7, but, in a simplified construction, the lower member section having the smaller profile cross section 1b forms a downwardly offset, separate profile and is preferably supported on the lower region of the floor crossmember 7 and/or on the upper member section, if appropriate arranged such that it overlaps the latter, or is connected fixedly to it/them.

As FIG. 1 furthermore shows, the longitudinal members 1 extend in each case obliquely outward continuously into the rear region of the passenger cell 4 and into the immediate vicinity of the sill 6 and of the rear floor crossmember 8 and are supported essentially firstly in each case on the front floor crossmember 7 and secondly, level with the rear region of the passenger cell 4 in the direct vicinity of the sill 6 and of the rear floor crossmember 8, on a stiff bodywork component, like a junction element, and are preferably welded to these components. Furthermore, at least in some sections a fixed connection is provided by welding to the floor panel 3 in order to suppress material vibrations of the same, together with annoying noises. The effect in particular also achieved by this configuration is that, in the event of a head-on crash, the forces which occur can advantageously be transferred to the rear part of the vehicle and therefore, in comparison to conventional configurations, a considerably larger bodywork region or underbody region can be involved into the transmission and absorption of force.

In extensive investigations it has furthermore been found that the abovementioned graduation of the profile cross section from the front to the rear has an extremely advantageous effect on the desired transfer of force into the region of the rear floor crossmember 8. Furthermore, this measure was able to reduce the weight of the floor-supporting configuration to a necessary minimum, from which, in turn, savings on material can be achieved.

According to a further embodiment, the longitudinal members 1 are guided rearward until level with a seat crossmember 12, which is arranged approximately in the center of the passenger cell 4, and advantageously also brace against the seat crossmember. This measure also makes it possible to ensure a satisfactory absorption and transfer of force into adjacent components of the underbody.

In order to achieve an even higher stiffening of the floor stiffening structure, in particular in defined, particularly stressed member regions, it is advisable to provide the longitudinal members 1 and/or the front floor crossmember 7 as a shaped or formed steel sheet which is manufactured by the so called tailored-blank technique which is known per se.

Likewise, if the stresses are particularly high, for example in the case of off-road vehicles, it may be advisable to form the longitudinal members 1 and/or the front floor crossmember 7 from higher strength or high tensile steel. In order to further increase the stiffness of the structure, it is advantageous if the front floor crossmember 7 and/or the end plate 9 thereof and—in the case of a multipart floor—the tunnel insert and/or other parts of the floor stiffening structure are formed from heat-formed, maximum strength steel sheet.

Figure 5:
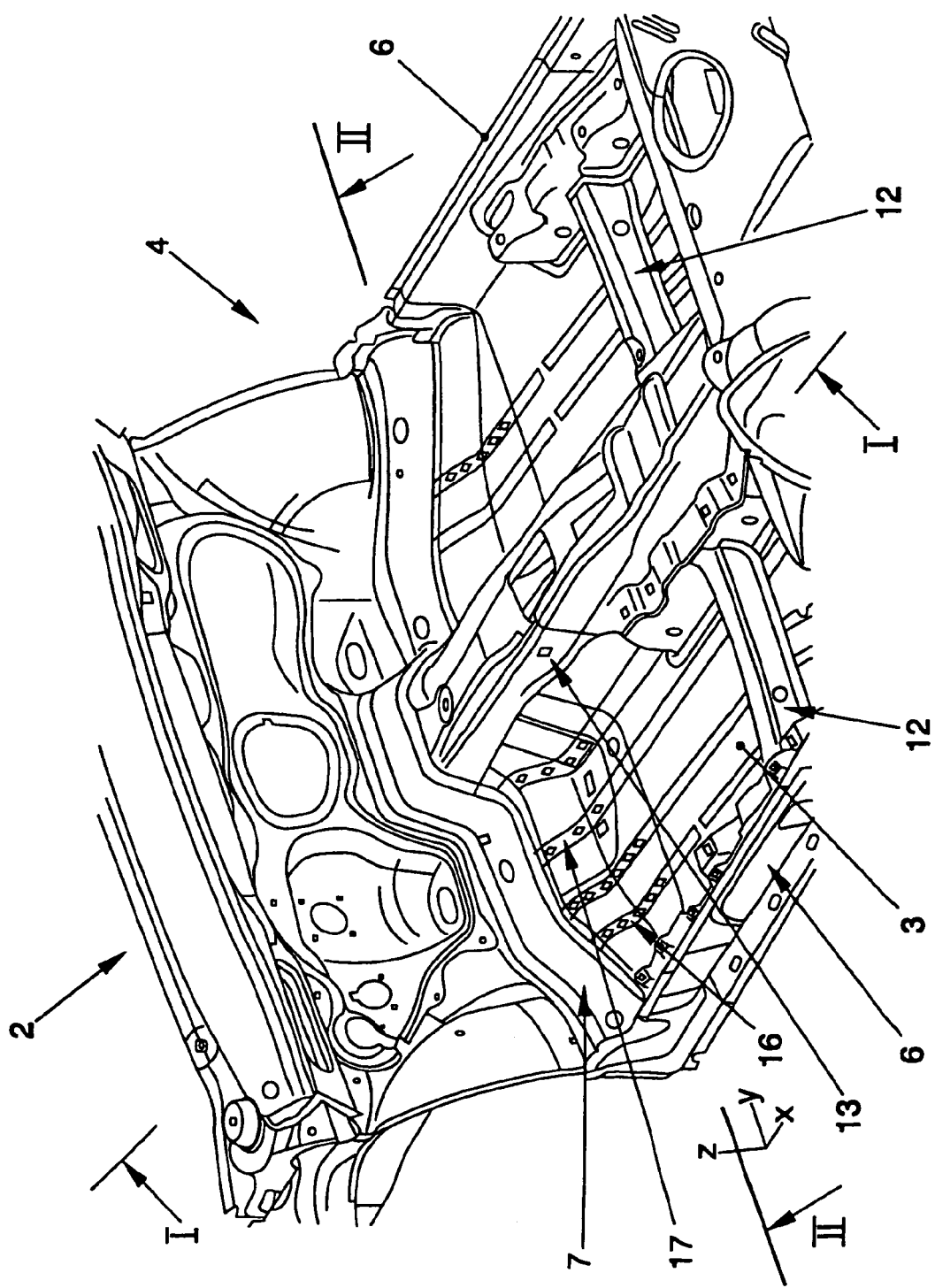
FIG. 5 is a diagrammatic perspective view of the footwell of the passenger cell according to the invention.
Figure 6:
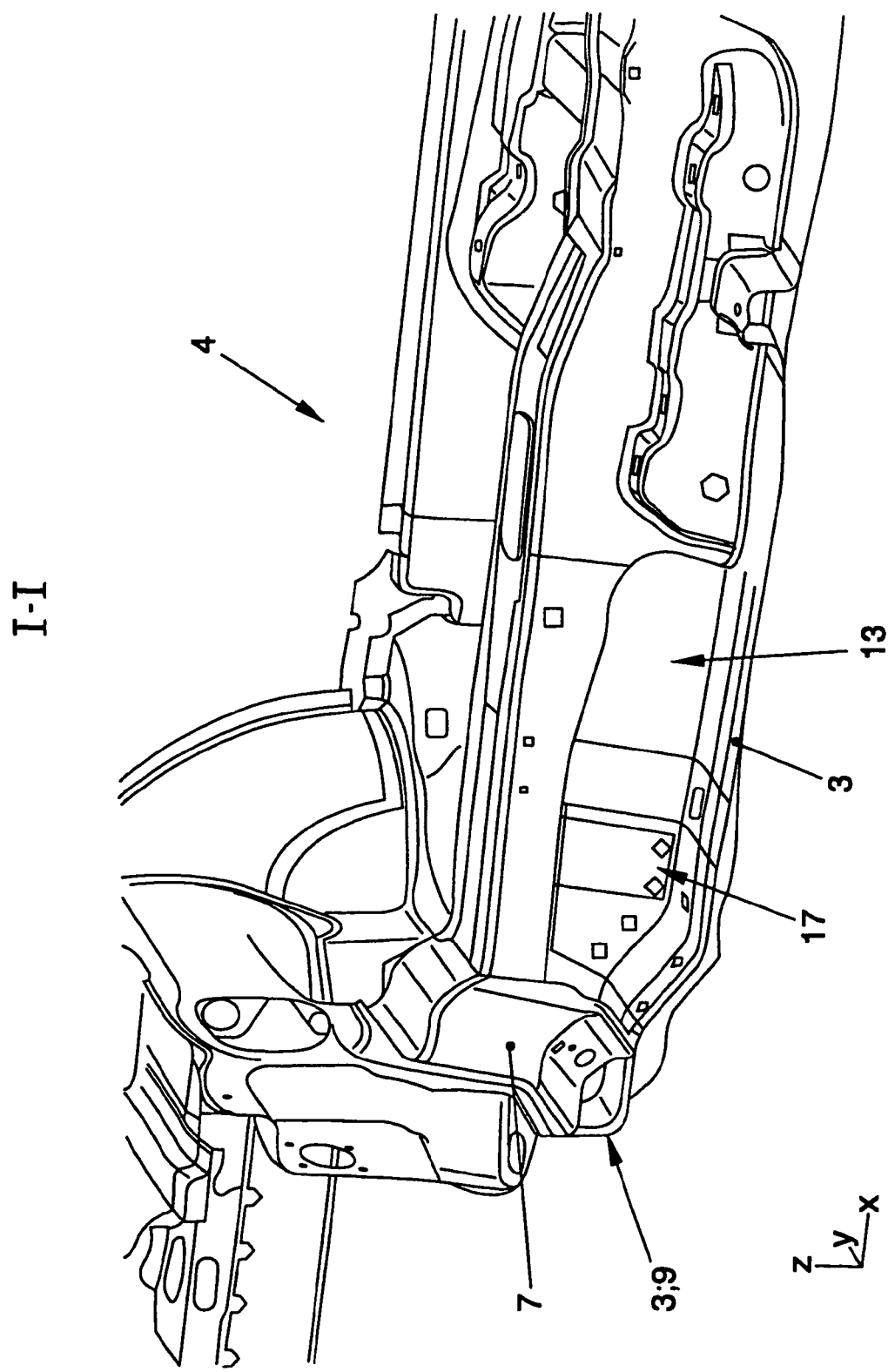
FIG. 6 is a diagrammatic sectional view of section I—I indicated in FIG. 5.
Figure 9:
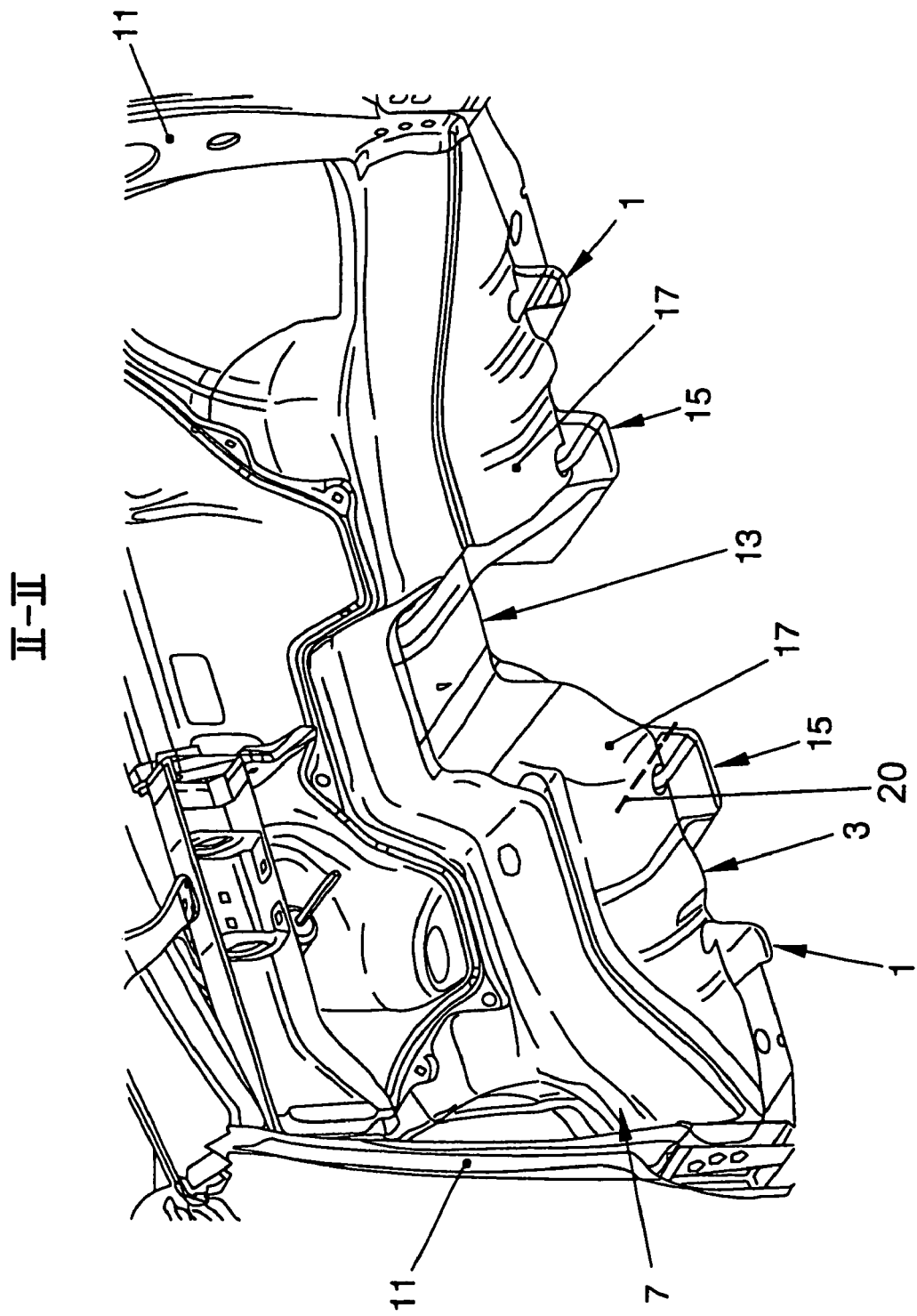
FIG. 9 is a diagrammatic sectional view of section II—II indicated in FIG. 5.

According to FIGS. 5, 6 and 9, a tunnel element 13, which stabilizes the vehicle bodywork, is provided in the central region of the vehicle and is oriented in the longitudinal direction of the vehicle and is preferably formed from an inwardly pointing, cap-shaped metal sheet. In order to obtain a further stiffening of the vehicle bodywork, in particular an increased protection of the passenger cell 4 from undesired deformation in the event of a crash, the front floor crossmember 7 is fixed both on the sill 6 and on the tunnel element 13.

Figure 7:
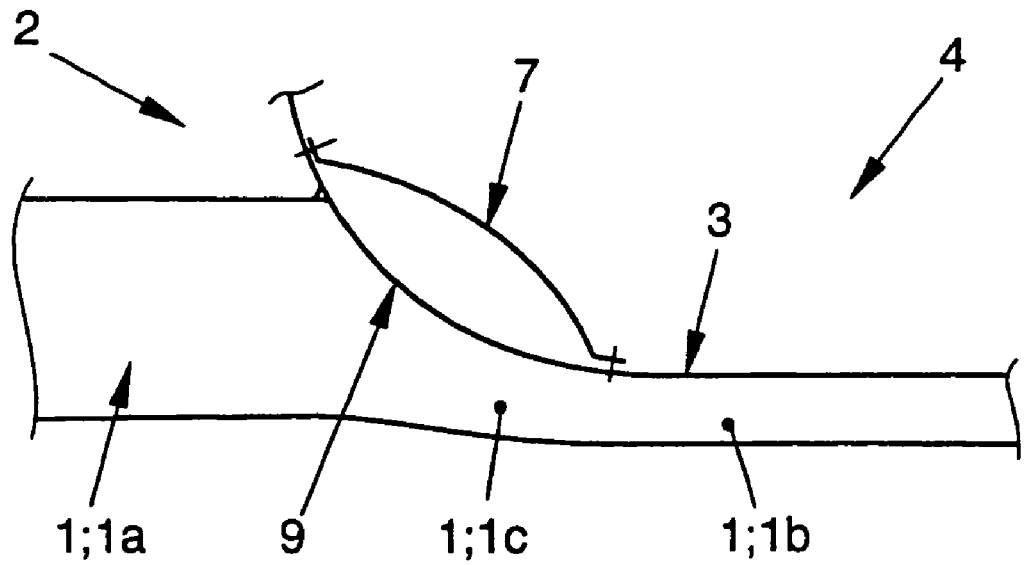
FIG. 7 is a diagrammatic partial sectional view of the configuration of the front floor crossmember in a first variant embodiment according to the invention.

Furthermore, FIGS. 5 to 7 illustrate a front floor crossmember 7, which crossmember, for its part, is formed by an open hollow profile which is placed from within the passenger cell 4 against a floor panel 3, which is guided upward, and is connected fixedly to the latter, preferably welded thereto. As explained above, the longitudinal members 1 are supported on this particularly stiff construction in the form of a closed hollow profile.

Figure 8:
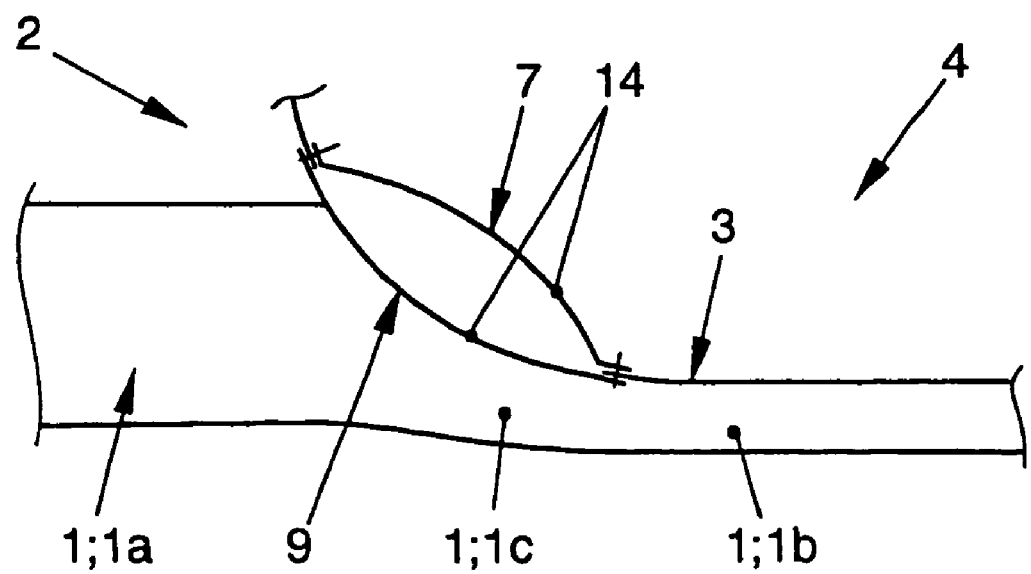
FIG. 8 is a diagrammatic partial sectional view of the configuration of the front floor crossmember in a second variant embodiment according to the invention.

A further possibility of producing a suitable, front floor crossmember 7 is shown in FIG. 8. In this case, the front floor crossmember 7 includes at least two profile shells 14 which are placed on one another and, for their part, likewise form a closed hollow profile. The floor panel 3 adjoins this hollow profile.

An even greater stiffening of the vehicle bodywork is achieved by at least one further longitudinal member element 15 being arranged between each longitudinal member 1 and the tunnel element 13 and being placed from below against the floor panel 3 as is illustrated in FIG. 1. In this case, this longitudinal member element 15 extends from the front floor crossmember 7 until level with the seat crossmembers 12 which, for their part, extend in each case in the transverse direction of the vehicle between the tunnel element 13 and a sill 6 and are fastened to the latter and to the floor panel 3, preferably are welded to them. However, it is also conceivable to guide the longitudinal member element 13 as far as the rear floor crossmember 8 and to join it to the latter.

In addition, an add-on longitudinal member, which is only schematically indicated as a dashed line 20 in FIG. 9, can be assigned to the longitudinal member element 15 such that the add-on longitudinal member is disposed, opposite the longitudinal member element 15, on the passenger cell side.

Furthermore, it has turned out in the extensive investigations that, in particular, the region of the footwell 16 is susceptible to deformation and accordingly, has to be protected. For this purpose, according to FIG. 5, a reinforcing plate 17, which in the present case reaches into the contour of the tunnel element 13, is placed on the floor panel 3 on the passenger cell side, at least in the connecting region of the tunnel element 13, front floor crossmember 7 and floor panel 3.

As can be seen in FIG. 1, it is furthermore advisable for this purpose to provide laterally on the outside a so-called A-pillar connecting element 18 which, as a sheet-metal shaped part, achieves a particularly stiff connection in the manner of a junction element between the A-pillar 11, shown in FIG. 9, the front floor crossmember 7, a longitudinal member 1 and a sill 6.

These abovementioned measures are particularly suitable for comprehensively protecting the passenger cell 4 against deformation.

Furthermore, the longitudinal members 1 and, in the present case, also the further longitudinal member elements 15 have proven particularly appropriate for supporting an auxiliary frame on them which frame is known per se. Accordingly, appropriate mounts 19 for securing the auxiliary frame are assigned to the longitudinal members 1 and the further longitudinal member elements 15.

We claim:

1. A vehicle body configuration, comprising:
   a passenger cell including a floor panel closing off said passenger cell at a bottom thereof;
   a vehicle front part adjacent said passenger cell;
   two sills extending alongside said passenger cell;
   two longitudinal members disposed between said two sills and extending from said vehicle front part rearward under said floor panel;
   a floor-supporting configuration including a front floor crossmember with an end panel, said front floor crossmember being fixedly connected to said two sills and extending, between said two sills, transversely with respect to a longitudinal vehicle axis;

each of said longitudinal members butting, with a first profile cross section, against said end panel of said front floor crossmember;

each of said longitudinal members extending, offset in height, with a second profile cross section smaller than the first profile cross section, under said floor panel; and said floor supporting configuration including web plates, said sills having cutouts formed therein, said front floor crossmember being fixed, via said web plates, on said sills having said cutouts.

2. The vehicle body configuration according to claim 1, wherein said longitudinal members are embodied as continuous longitudinal members.

3. The vehicle body configuration according to claim 1, wherein said longitudinal members each include an upper member portion with the first profile cross section and a lower member portion with the second profile cross section, such that said upper member portion is placed on said end panel and such that said lower member portion is embodied as a separate profile offset downward with respect to said upper member portion and extends under said floor panel.

4. The vehicle body configuration according to claim 1, wherein said longitudinal members extend, under said floor panel, to a seat crossmember disposed at a middle region of said passenger cell.

5. The vehicle body configuration according to claim 1, wherein said longitudinal members extend to a rear floor crossmember disposed at a rear region of said passenger cell, such that said longitudinal members extend obliquely outward toward said sills and such that said longitudinal members brace against a stiff bodywork component.

6. The vehicle body configuration according to claim 1, wherein said longitudinal members brace against a stiff bodywork component configured as a junction element.

7. The vehicle body configuration according to claim 1, wherein at least one element selected from the group consisting of said front floor crossmember and said longitudinal members is a shaped steel sheet element formed from a tailored blank.

8. The vehicle body configuration according to claim 1, wherein at least one element selected from the group consisting of said front floor crossmember and said longitudinal members is a high-tensile steel element.

9. The vehicle body configuration according to claim 1, including:

a tunnel element disposed in said passenger cell such that said tunnel element extends in a direction of the longitudinal vehicle axis; and said front floor crossmember is fixed, with a central region thereof, to said tunnel element.

10. The vehicle body configuration according to claim 1, wherein said front floor crossmember is an open hollow-profile member placed, from within said passenger cell, against an upwardly extending portion of said floor panel.

11. The vehicle body configuration according to claim 1, wherein said front floor crossmember includes at least two profile shells placed on one another, such that said at least two profile shells form a closed hollow profile adjoining said floor panel.

12. The vehicle body configuration according to claim 1, including:

a tunnel element disposed in said passenger cell such that said tunnel element extends in a direction of the longitudinal vehicle axis; and a further longitudinal member element disposed between each respective one of said longitudinal members and said tunnel element and placed from below against said floor panel.

13. The vehicle body configuration according to claim 12, including an add-on longitudinal member assigned to said further longitudinal member element such that said add-on longitudinal member is disposed, in said passenger cell, opposite said further longitudinal member element.

14. The vehicle body configuration according to claim 1, including:

a tunnel element disposed in said passenger cell such that said tunnel element extends in a direction of the longitudinal vehicle axis; and a reinforcing plate disposed on said floor panel in a region of said passenger cell where said tunnel element, said front floor crossmember and said floor panel meet one another.

15. The vehicle body configuration according to claim 14, wherein said reinforcing plate covers at least a portion of said tunnel element.

16. The vehicle body configuration according to claim 1, including an A-pillar connecting element disposed next to each respective one of said longitudinal members and substantially on a same level as said longitudinal members, said A-pillar connecting element being fixedly connected to said respective one of said longitudinal members.

17. The vehicle body configuration according to claim 1, including auxiliary frame mounts disposed at said longitudinal members.

18. The vehicle body configuration according to claim 12, including an auxiliary frame mount disposed at said further longitudinal member element.

19. In a vehicle body having a passenger cell with a floor panel closing off said passenger cell at a bottom thereof, a vehicle front part adjacent said passenger cell, two sills extending alongside the vehicle body, two longitudinal members disposed between the two sills and extending from the vehicle front part rearward under the floor panel, a floor-supporting configuration, comprising:

a front floor crossmember with an end panel, said front floor crossmember being fixedly connected to the two sills and extending, between the two sills, transversely with respect to a longitudinal vehicle axis;

each of the longitudinal members butting, with a first profile cross section, against said end panel of said front floor crossmember;

each of said longitudinal members extending, offset in height and with a second profile cross section smaller than the first profile cross section, under the floor panel; and web plates for connecting said front floor cross member to the sills, such that said front floor crossmember is fixed, via said web plates, on the sills which have cutouts formed therein.

* * * * *